Oct. 7, 1969     D. L. STIVENDER     3,470,857
INTERNAL COMBUSTION ENGINE CONSTRUCTION AND
METHOD FOR IMPROVED OPERATION WITH
EXHAUST GAS RECIRCULATION

Filed Sept. 5, 1968     2 Sheets-Sheet 1

INVENTOR
Donald L. Stivender
BY
Robert J. Outland
ATTORNEY

United States Patent Office 3,470,857
Patented Oct. 7, 1969

3,470,857
INTERNAL COMBUSTION ENGINE CONSTRUCTION AND METHOD FOR IMPROVED OPERATION WITH EXHAUST GAS RECIRCULATION
Donald L. Stivender, Warren, Mich., assignor to General Motors Corporation, Detroit, Mich., a corporation of Delaware
Continuation-in-part of application Ser. No. 644,369, June 7, 1967. This application Sept. 5, 1968, Ser. No. 757,644
Int. Cl. F02m 7/12; F02b 27/04; F01l 1/04
U.S. Cl. 123—119
7 Claims

ABSTRACT OF THE DISCLOSURE

A spark ignition internal combustion engine construction and method of operation to provide smooth operation with recirculation of exhaust gases into the inlet manifold. The method involves the recirculation of exhaust gases in conjunction with the use of intake valve throttling to reduce cycle-to-cycle variations in the combustion process. The apparatus includes means for varying the openings of the intake valves during operation, exhaust recirculation means including a control valve and fuel control means which respond to the total gas flow into the engine combustion chambers to determine the desired gas-fuel mixture ratio.

Cross reference to related application

This application is a continuation-in-part of my copending United States patent application Ser. No. 644,369, filed June 7, 1967, now United States Patent Number 3,422,803 and the entire disclosure of which is hereby incorporated by reference into the present application.

Background of the invention

This invention relates to internal combustion engines and more particularly to the construction and method of operation of an internal combustion engine so as to provide smooth operation in conjunction with the recirculation of exhaust gases into the induction system to dilute the inlet gas charge.

It is known in the art relative to spark ignition internal combustion engines that the recirculation of predetermined amounts of exhaust gases into the induction system to dilute the air-fuel mixture may have the effect of reducing the amounts of oxides of nitrogen released to the atmosphere in the engine exhaust gases. Various systems for the recirculation of such exhaust gases are known in the prior art and some workers in the field have reported the satisfactory recirculation of exhaust gases in amounts up to 25% of the fresh air intake to the engine induction system.

While the smooth operation of engines with such high percentages of exhaust gas recirculation has been reported, it has been found that attempts to operate conventional engines with exhaust gas recirculation in excess of about 10% of the inlet air leads to excessive cycle-to-cycle variations in combustion in the engine cylinders which adversely affect drivability of vehicles in which such engines are installed. I have observed that this deterioration in the repeatability of the cycle-to-cycle combustion processes is similar to that which occurs when operating conventional engines with lean air-fuel mixtures above air-fuel weight ratios of about 17:1.

The effects of such lean mixture operation in conventional engines and means for obtaining satisfactory operation at leaner air-fuel ratios than is normally possible are disclosed in my aforementioned United States Patent Number 3,422,803. That patent teaches that the variation of the openings of the engine intake valves to control the amount of air-fuel mixture drawn into the engine combustion chambers causes increased rates of combustion at least in the middle and lower ranges of engine power and permits satisfactory operation of a spark ignition engine with air-fuel weight ratios up to and above 20:1.

Summary of the invention

The present invention proposes the use of intake valve throttling, that is, controlling the amount of combustion chamber charge by variation of the inlet valve openings, in combination with the recirculation of controlled amounts of exhaust gases from the engine exhaust system to the induction system as well as means for accomplishing these steps. This method and means resulted from my discovery of the similarity between the operation of an engine with relatively high amounts of exhaust recirculation and conventional air-fuel ratios to the operation of an engine with lean air-fuel ratios but without recirculation.

The present invention, resulting from this discovery, permits satisfactory operation with higher percentages of exhaust recirculation at any selected air-fuel ratio than is possible with prior art recirculation systems applied to conventional engines. The actual amounts of recirculation possible would appear to depend upon the air-fuel ratio as well as other factors but are found to be higher with the present invention than with the comparable prior art means.

Various other advantages and applications of the invention will be apparent from the following description of a preferred embodiment selected for purposes of illustration.

Brief description of the drawings

In the drawings:
FIGURE 1 is a cross-sectional view of an internal combustion engine incorporating a preferred form of apparatus made according to the invention and suitable for operation in accordance therewith.

Description of the preferred embodiment

Figure 2:
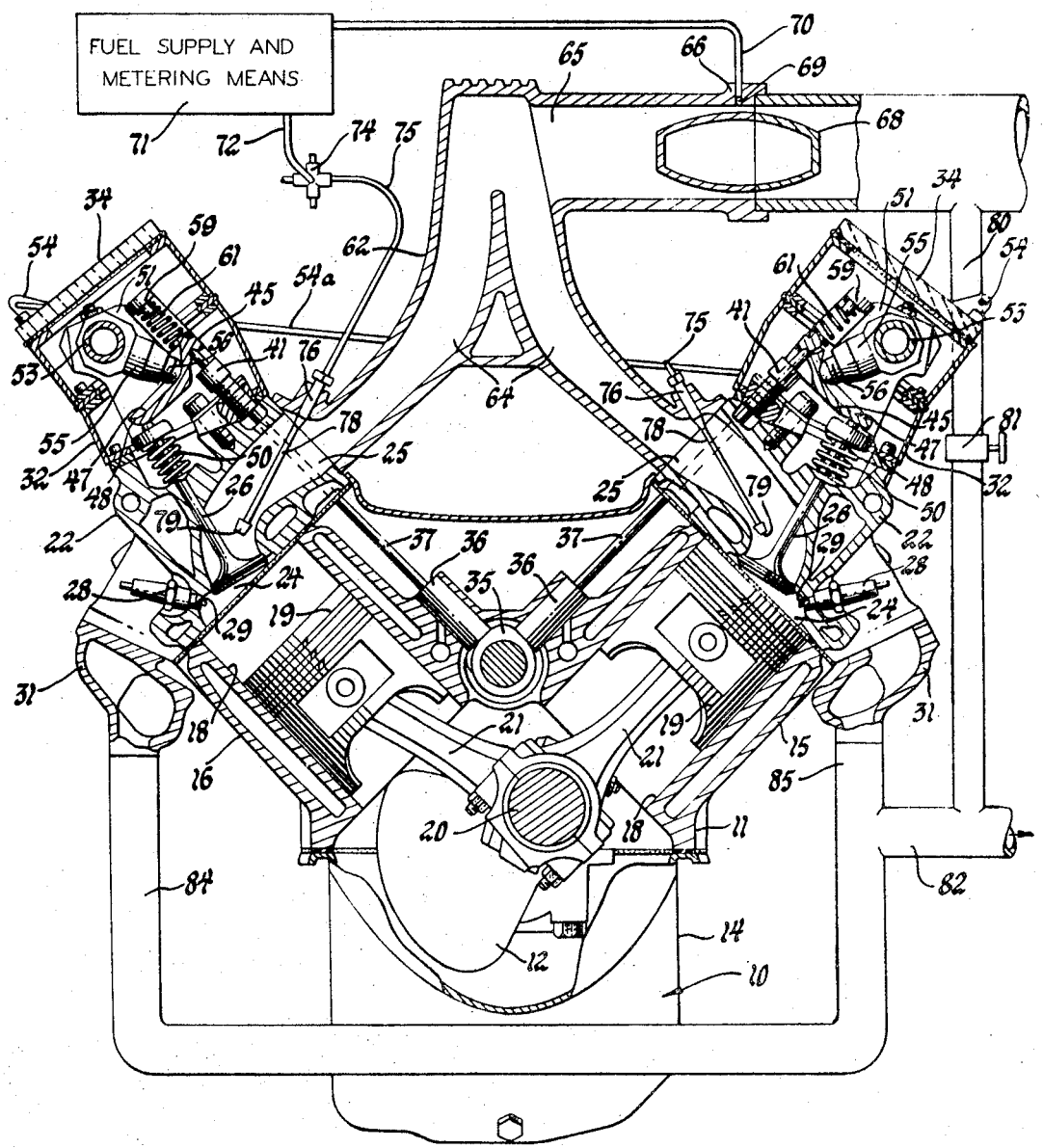
FIGURE 2 is a diagrammatic view of the gas recirculation and control system of the engine of FIGURE 1
Figure 2:
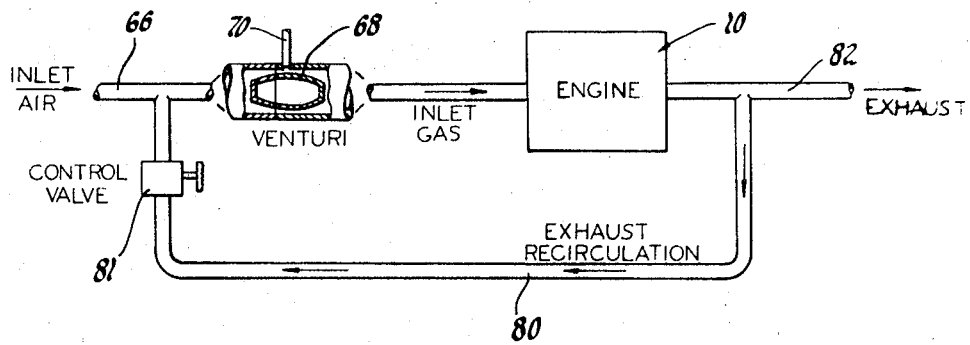

In the drawings, numeral 10 generally indicates an internal combustion engine including a cylinder block 11 rotatably journaling a crankshaft 12 and carrying an oil pan 14 closing the lower portion of the block and enclosing the crankshaft supporting portions. Cylinder block 11 includes a pair of angularly extending cylinder banks 15, 16 each having a plurality of longitudinally aligned cylinders 18 in each of which is reciprocably disposed a piston 19 connected with a crank throw 20 of the crankshaft by connecting rods 21. These elements operate in a conventional manner to convert reciprocating action of the pistons into rotating motion of the crankshaft.

Mounted on the cylinder block 11 and closing the upper ends of the cylinders of each bank in a conventional manner are cylinder heads 22. The cylinder heads cooperate with the cylinders to define combustion chambers 24 and include inlet passages 25 closed by inlet poppet valves 26 to provide for the admission of combustible mixtures to the combustion chambers. Also provided in the cylinder heads are spark ignition devices, such as spark plugs 28 extending through openings 29 into the combustion chambers 24, and exhaust passages (not shown) closed by the usual exhaust valves (not shown) and connecting with conventional exhaust manifolds 31 to provide for the removal of exhaust products from the cylinders.

The upper portions of the heads are closed by valve covers 32 which form enclosures for the valve actuating mechanisms and may include transparent cover portions 34 to permit viewing the operation of the valve mechanisms.

The actuating mechanism for the exhaust valves is conventional and includes a camshaft 35 driven from the crankshaft and centrally carried in the cylinder block intermediate the cylinder banks. The camshaft actuates conventional hydraulic lifters 36 which are reciprocably carried in the block 11 and in turn engage conventional push rods 37. The push rods act upon cylinder head carried rocker arms (not shown) which in turn engage the stems of the exhaust valves (not shown) to open and close them in a conventional manner.

A special valve actuating mechanism of the type disclosed in my United States Patent Number 3,422,803 is provided for operating the inlet valves. This mechanism includes the conventional camshaft 35 used for actuating the exhaust valves as it also includes a separate cam lobe for each inlet valve of the engine. These cam lobes actuate conventional hydraulic lifters 36 and push rods 37 as do the exhaust cam lobes of the camshaft. The inlet valve push rods extend through special guide and stop members 41 which are threadably received in the cylinder heads and limit movement of these push rods to reciprocating action. The upper ends of the push rods engage specially shaped floating rocker levers 45 each of which include a concave substantially arcuate or cylindrical surface 47 on its upper side and a convex valve stem receiving surface 48 opposite surface 47. Surface 48 receives the stem of the respective inlet valve 26 to actuate it in an opening direction as will be subsequently described. Conventional coil springs 50 are provided to close the inlet and exhaust valves.

The inlet valve actuating mechanism further includes a pair of support members 51 mounted on each cylinder head and journaling rotatably adjustable control shafts 53. The control shafts extend longitudinally of the heads to positions adjacent each rocker lever 45 and beyond one end of covers 32 where they are connected with suitable operating means, such as levers 54, which are interconnected to operate in unison by a cross-shaft 54a. Fixed on the shafts 53 adjacent each inlet rocker lever 45 is a control arm and hydraulic lash adjuster retainer 55 which receives a lash adjuster 56. Lash adjuster 56 engages surface 47 of its respective rocker lever to act as a fulcrum or pivot for the rocker arm lever. Each support 51 also retains a spring retaining member 59 which acts to retain a coil spring 61 in compressed engagement with the rocker lever 45.

In operation, the inlet valve gear of the engine provides for a periodic opening and closing motion of each inlet valve occurring at a predetermined point and occupying a predetermined portion of the engine cycle as fixed by the shape of the inlet cam lobe on camshaft 35. In the above-described mechanism, the lift of the valves at each point in the cam lift cycle is controllable to permit any opening movement from the maximum provided for the valve gear down to a zero lift position wherein the inlet valves do not open at all. During each opening and closing motion each inlet valve moves through a range of opening positions, the valve being controllable at any range between and including zero opening and a predetermined maximum, at which the opening values at all points of the opening curve are maximized.

Inlet valve actuation is accomplished through rotation of camshaft 35, each inlet cam lobe of which periodically reciprocates a hydraulic lifter 36 and in turn the respective push rod 37. The push rod in turn lifts the end 46 of rocker lever 45 against the bias of spring 61 causing the lever to pivot around the pivot surface of lash adjuster 56 and depress the associated inlet valve 26 to open the same. When the cam lobe passes lifter 36, valve spring 50 closes the valve and return spring 61 pushes rocker lever 45 against stop member 41 and holds it there for a dwell period until the next valve opening cycle. During this dwell period all valve lash in the system is taken up by the hydraulic lash adjuster 56 and the lifter 36 so that lost motion in the valve actuating mechanism is taken up.

FIGURE 1 shows the mechanism of the valve gear in the position in which maximum valve lift is obtained. Shafts 53 have been rotated by levers 54 to their extreme inward positions moving the contact point of lash adjuster 56 with rocker lever surface 47 to its closest permitted distance from push rod 37. In this position, actuation of the mechanism by the cam lobe moves the valve to its furthest open position.

When the shafts 53 are rotated to their opposite extreme positions, the lash adjuster 56 engages the rocker arm surface 47 above the end of valve 26 so that movement of the push rod creates no opening force on the valve and the valve remains closed. Thus, varying the position of lever 54 from one extreme to the other varies the periodic opening movements of the inlet valves in unison from zero to the maximum opening permitted by the mechanism. Further details of the mechanism and its operation are disclosed in my aforementioned United States Patent Number 3,422,803.

Positioned between the cylinder banks is a ram type induction manifold 62 which contains individual passages 64 connecting with passages 25 of the respective cylinders and fed by a common inlet passage 65 provided adjacent the upper end of the manifold. The passage 65 is formed by an inlet conduit 66 which retains a venturi member 68. An opening 69 at the throat of the venturi connects through conduit 70 to suitable fuel supply and metering means 71. Means 71 is connected with a source of fuel and connects through conduit 72, connector 74 and individual feed lines 75 to nozzle fittings 76 carried in the induction manifold adjacent the end of each passage 64 and having tubular extensions 78 extending into cylinder head passages 25. Nozzles 78 terminate in orifices 79 located adjacent valves 26 and are adapted to deliver a stream of fuel directly on the stem of each intake valve 26.

Upstream of venturi 68, the inlet conduit 66 is connected with exhaust recirculation means including a conduit 80 having an adjustable control valve 81 and connecting with a common exhaust pipe 82. Pipe 82 connects, through branches 84, 85, the exhaust manifolds 31 of the engine with the usual exhaust system components such as a muffler (not shown). Upstream of its connection with recirculation conduit 80, the inlet conduit 66 is open to the atmosphere, preferably through conventional air filter means (not shown). The exhaust recirculation means is adapted to permit the directing of a portion of the engine exhaust gases through conduit 80 to mix with the inlet air in the inlet conduit 66, the amount of exhaust gas recirculation being controlled by adjustment of valve 81. The valve is shown as manually adjustable but could also be controlled through suitable automatic devices (not shown) as desired.

The fuel supply and metering means 71 may be of any suitable construction which is adapted to utilize the pressure signal transmitted through orifice 69 and conduit 70 from the throat of venturi 68 so as to deliver a metered supply of fuel controlled as desired in proportion to the flow of inlet gas passing through venturi 68 into the inlet manifold 62 and to deliver the fuel equally to the various individual cylinder head inlet passages where it is sprayed into the incoming gas stream.

In the disclosed construction, no throttling means is used for controlling the charge of gas and fuel delivered to the cylinders except for the control of inlet valve lift. It is, however, within the broad concept of the invention to use in addition to the throttling action of the inlet valves a throttling means upstream of the inlet valves so long as a sufficient pressure drop across the inlet valves is provided to accomplish in substantial measure the objectives of the invention. Carburetor type fuel supply means could also be used rather than the fuel injection type system disclosed.

In operation, inlet gas, made up of air and exhaust gases, is drawn at a rate controlled by the extent of inlet valve openings through venturi 68 and into the various passages of the intake manifold and cylinder head. The rate of gas motion through the venturi causes a pressure signal to be transmitted through conduit 70 to the fuel supply and metering means 71 which then delivers fuel through the individual nozzles 79 to the cylinder head inlet passages immediately adjacent the inlet valves at a rate proportional to the gas flow. The fuel flow rate may be controlled as desired in accordance with the engine conditions or other criteria by suitable mechanism in the fuel supply and metering means. The amount of exhaust gas in the inlet gas is likewise controllable by adjustment of the valve 81.

During the intake stroke of each piston, its respective inlet valve is opened by the valve mechanism previously described, the amount or extent of opening being controlled manually by the operator or automatically through the valve actuating mechanism (including arms 54) in accordance with the desired power output of the engine. With this arrangement, pressure in the inlet manifold and cylinder head inlet passages remains very near atmospheric while the pressure in the various cylinders during their intake strokes is below atmospheric, the pressure reduction reached being dependent upon the inlet valve openings. With the valves completely closed, cylinder pressures may drop below one-tenth of an atmosphere during the intake stroke. This value is well below the critical pressure, making the amount of charge entering the cylinder depend on the valve opening area. Thus, varying the opening of the intake valve acts as a means of varying the amount of fuel and gas mixture which is delivered to each cylinder on its intake stroke.

FIGURE 2 illustrates in schematic form the gas flow system of the engine of FIGURE 1, the reference numerals being identical in both figures. In this system, which represents an arrangement actually used for test purposes, it is apparent that recirculation of exhaust gases from the exhaust line 82 to the inlet conduit 66 produces an inlet gas mixture which passes through the venturi and is used as a reference for determining the amount of fuel added to the inlet gas before delivery to the engine combustion chambers. With this arrangement, the fuel supply and metering means operates on the basis of a predetermined gas-fuel ratio in which the inlet gas may be defined as the combined weight of air and exhaust gas passing through the venturi and into the engine.

Figure 3:
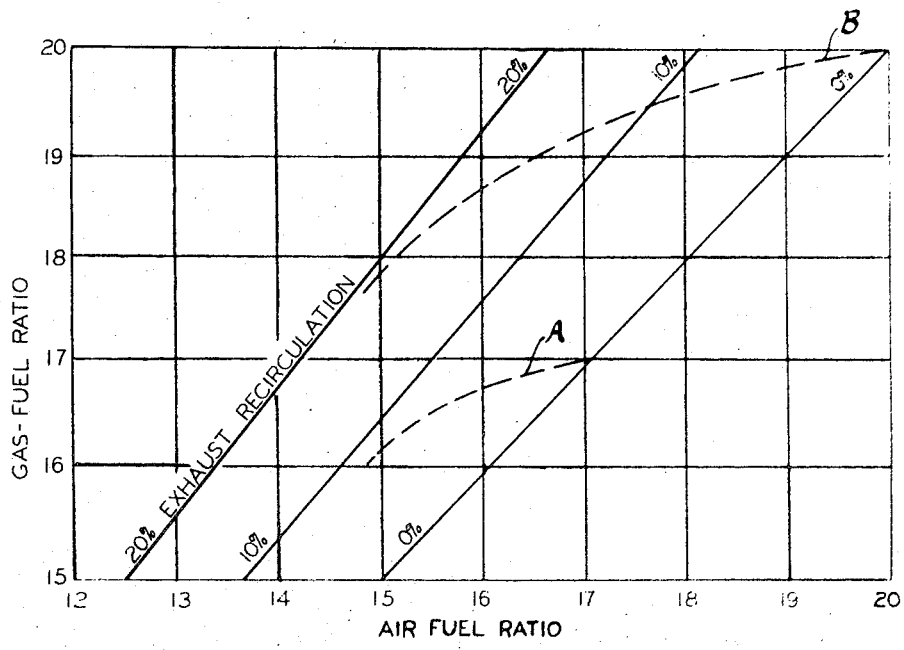
FIGURE 3 is a graphic illustration of the relationships of gas and air-fuel ratios with various percentages of exhaust gas recirculation expressed as a percent of the engine intake air.

FIGURE 3 graphically compares air-fuel ratios with the gas-fuel ratios obtained using varying percentages of exhaust gas recirculation to the engine inlet. In each case, the amount of exhaust gas recirculation is expressed as a percent of the weight of inlet air. The figure illustrates that the air and gas-fuel ratios are the same at zero percent recirculation but that for a constant gas-fuel ratio, the air-fuel ratio is reduced as the percent exhaust recirculation is increased.

Also shown in FIGURE 3 is a curve A which represents a theoretical maximum flame temperature calculated to be reached in the combustion chambers under various conditions including 17:1 air-fuel ratio and zero percent exhaust recirculation. This curve represents the approximate limit which tests have indicated for satisfactory operation of conventional engines with varying degrees of exhaust recirculation. Thus, it is known that a limit of about 17:1 air-fuel ratio with no exhaust recirculation exists for a conventional engine. In the same manner, it has been found that as the amount of exhaust gas recirculation approaches a value of about 10 percent, the drivability limit of a conventional engine is reached. Presumably, the intermediate points of such a limit are approximately as indicated by the curve A, assuming reasonable latitude for variations in observed results.

A second curve B is shown in FIGURE 3 extending from the location of 20 percent air-fuel ratio and zero percent exhaust recirculation. This curve also represents a calculated maximum flame temperature in the combustion chambers which is lower than that of curve A and represents the temperatue reached during operation with lean air-fuel mixtures or with richer mixtures and varying amounts of exhaust recirculation as illustrated. In general, I have found that operation at any of the various conditions of air or gas-fuel ratios and percent exhaust recirculation below the curve B gives satisfactory drivability of a vehicle when using a valve throttled engine of the type disclosed in FIGURE 1 and previously described. Such operating conditions can be obtained over at least a large portion of the engine power range and in many cases conditions above the curve are likewise obtainable. It has, for example, been demonstrated that operation of my engine construction with an 18:1 gas-fuel ratio is satisfactory over a range of exhaust recirculation percentages of from near zero to about 18 percent. Looked at another way, it may be said that at 16:1 air-fuel ratio, my arrangement has an ability to operate satisfactorily at nearly 17 percent exhaust recirculation while a comparable conventional engine would be limited to about 4½ percent.

This improvement in operation, due to the use of the valve throttling concept apparently results from the increased turbulence in the cylinders which exists under all but the full power conditions of the engine and which is explained in detail in my previously mentioned copending application with respect to engines not including the exhaust recirculation concept. It appears unnecessary to further describe these effects here except to state that they apparently give similar results in increasing the ability of engines to operate with high percentages of exhaust recirculation as they do in increasing their ability to operate at lean air-fuel mixtures.

The advantages of the method and apparatus provided by the present invention are seen to be improvement in the ability to operate satisfactorily at gas-fuel ratios and percentages of exhaust recirculation which would otherwise not be practical. As has been indicated, operation with substantial amounts of exhaust recirculation has possible advantages in the reduction of oxides of nitrogen in the engine exhaust gases and may, therefore, be of substantial importance in relation to efforts to reduce smog producing elements in the atmosphere.

While the features of the instant invention have been explained by reference to a specific embodiment, it should be apparent that numerous changes could be made without departing from the inventive concepts disclosed. For example, various types of induction and fuel supply means could be utilized, as could exhaust recirculation means connecting any part of the exhaust system with any part of the induction system upstream of the engine inlet valves. Numerous different means for varying the range of inlet valve openings could also be used within the scope of the invention.

I claim:
1. The method of operating a spark ignition internal combustion engine utilizing liquid hydrocarbon fuel, said engine being of the type having a cylinder, a piston reciprocably disposed in the cylinder, inlet means opening to the cylinder and including an inlet valve that is opened for a portion of each intake stroke of the piston to draw gas-fuel mixture into the cylinder, exhaust means connecting with the cylinder and arranged to receive exhaust gases therefrom during each exhaust stroke of the piston and recirculation means connecting the exhaust and inlet means to permit controlled recirculation of exhaust gases to the inlet means for mixing with the inlet air to form the cylinder gas charge, said method being characterized by the step of varying the extent of inlet valve openings between a predetermined maximum range for maximum engine power and a predetermined minimum range for minimum engine power, the valve opening variation constituting a principal control determining the amount of gas drawn into the cylinder on each intake stroke, while simultaneously providing over at least a portion of the range of engine power values a predetermined recirculation of exhaust gases from the exhaust means to the inlet means.

2. The method of claim 1 whereby the amount of recirculation of exahust gases is at least ten precent (10%) by weight of the fresh air drawn into said inlet means.

3. The method of claim 1 being characterized by the further step of simultaneously maintaining over a substantial portion of the range of engine power values the gas-fuel weight ratio of the inlet charge at no less than 18:1.

4. An internal combustion engine comprising in combination
a cylinder,
a piston in said cylinder and reciprocable therein according to a predetermined cycle including induction and exhaust strokes,
inlet means connecting with said cylinder and including an inlet valve that is openable to control the intake of gas-fuel mixture to the cylinder,
valve actuating means adapted to open said inlet valve during the intake stroke portions of the engine cycle and to vary the extent of the inlet valve openings to control the quantity of inlet charge drawn into the cylinder,
exhaust means connecting with said cylinder to carry exhaust gases therefrom on the piston exhaust stroke and
recirculation means connecting the exhaust means with the induction means to permit recirculation of a portion of the exhaust gases into the inlet means to mix with air in the inlet means and form a part of the cylinder gas charge.

5. The combination of claim 4 wherein said recirculation means includes valve means for controlling the amount of exhaust gas recirculation from the exhaust means to the inlet means.

6. The combination of claim 4 wherein said inlet means includes metering means responsive to the flow of gas therethrough to control the induction of fuel into the inlet gas in a predetermined manner, said recirculation means being connected with the inlet means upstream of said metering means such that the recirculated exhaust gases pass through the metering means and the over-all gas-fuel ratio is unchanged by variations in the relative amount of exhaust gases introduced into the fresh air passing through the inlet means.

7. The combination of claim 6 wherein said recirculation means includes valve means for controlling the amount of exhaust gas recirculation from the exhaust means to the inlet means.

References Cited

UNITED STATES PATENTS

| 3,146,768 | 9/1964 | Osborne. | |
| 3,237,615 | 3/1966 | Daigh. | |
| 928,390 | 7/1909 | Loffler | 123—109 |
| 1,265,799 | 5/1918 | McKechnie | 123—109 |
| 3,318,292 | 5/1967 | Hideg | 123—119 |
| 3,320,928 | 5/1967 | Homfeld et al. | 123—119 |

OTHER REFERENCES

S.A.E. May 20–24, 1968, Meeting Technical Paper, No. 680399, "Intake Valve Throttling (IVT) A Sonic Throttling Intake Valve Engine," Society of Automotive Engineers, Inc., Two Penna. Plaza, N.Y., N.Y. (12 pages).

WENDELL E. BURNS, Primary Examiner.

U.S. Cl. X.R.

123—90, 109, 139